US 6,643,930 B2

(12) United States Patent
Issagholian-Havai

(10) Patent No.: US 6,643,930 B2
(45) Date of Patent: Nov. 11, 2003

(54) METHOD AND APPARATUS FOR PRODUCING END FLANGE MEMBER FOR CYLINDRICAL DUCT

(76) Inventor: Robert Issagholian-Havai, 5119 Azusa Canyon Rd., Baldwin Park, CA (US) 91706

( * ) Notice: Subject to any disclaimer, the term of this patent is extended or adjusted under 35 U.S.C. 154(b) by 0 days.

(21) Appl. No.: 09/920,906

(22) Filed: Aug. 2, 2001

(65) Prior Publication Data

US 2003/0025332 A1 Feb. 6, 2003

(51) Int. Cl.[7] .............................................. B21K 1/16
(52) U.S. Cl. ........................ 29/890.149; 29/890.144; 29/890.147; 29/890.15
(58) Field of Search .................. 29/890.14, 890.141, 29/890.144, 890.147, 890.149, 890.15, 557, DIG. 32; 285/405, 424, 363, 367, 379, 331; 72/167, 136

(56) References Cited

U.S. PATENT DOCUMENTS

| 1,148,480 | A | * | 7/1915 | Robinson | 72/167 |
|---|---|---|---|---|---|
| 1,158,294 | A | * | 10/1915 | Robinson | 72/167 |
| 1,673,477 | A | * | 6/1928 | Yates | 72/167 |
| 1,697,896 | A | * | 1/1929 | Yates | 72/167 |
| 2,093,933 | A | * | 9/1937 | Sinclair | 72/167 |
| 3,704,616 | A | * | 12/1972 | Taira | 72/167 |
| 5,342,100 | A | * | 8/1994 | Goodhue | 285/363 |
| 5,979,205 | A | * | 11/1999 | Uchida et al. | 72/167 |

FOREIGN PATENT DOCUMENTS

JP            59-73125        *  4/1984

* cited by examiner

Primary Examiner—Gregory Vidovich
Assistant Examiner—T. Nguyen
(74) Attorney, Agent, or Firm—Tod R. Nissle, P.C.

(57) ABSTRACT

A method for producing a cylindrical flange for the end of an air duct is produced by compressing a panel by differing amounts to cause the panel to take on an arcuate cylindrical shape.

1 Claim, 5 Drawing Sheets

METHOD AND APPARATUS FOR PRODUCING END FLANGE MEMBER FOR CYLINDRICAL DUCT

This invention relates to a flange connection for air conditioning ducts.

More particularly, the invention relates to a method and apparatus for making an end flange member for a cylindrical duct.

In a further respect, the invention relates to a flange member which is mounted on an end of a first air conditioning duct and is connected to an identical flange member mounted on the adjacent end of a second air conditioning duct, said ends of the first and second air conditioning ducts being aligned with and adjacent to one another.

Flange connections for air conditioning ducts are well known in the art. See, for example, U.S. Pat. No. 5,352,000 to Issagholian-Havai et al. Such flange connections are slidably attached to the wall at the end of an air duct and are then secured to the air ducts by welds, screws, or other fastening means. Each flange connection at an end of an air duct is then ordinarily secured to a like flange connection mounted on the adjacent end of another air duct.

The shape and dimension of air conditioning ducts can vary. One well known kind of duct has a cylindrical shape. The flanges which are mounted on the end of cylindrical air ducts typically have a cylindrical shape which is similar to that of a top hat. Manufacturing flanges for cylindrical air ducts is typically accomplished by "spinning" metal. While this prior art process is well known, it would be advantageous to develop a simpler method of making cylindrical flanges which does not require the prior at "spinning" process.

Accordingly, it would be highly desirable to provide an improved process for manufacturing a flange for the end of a cylindrical air duct.

Therefore, it is a principal object of the invention to provide an improved method and apparatus for producing an end flange for a cylindrical air duct.

These, and other, further and more specific objects and advantages of the invention will be apparent to those skilled in the art from the following detailed description thereof, taken in conjunction with the drawings, in which.

Briefly, in accordance with the invention, I provide an improved method for producing a hollow cylindrically shaped flange to be mounted on the end of a hollow cylindrical duct. The improved method comprises the steps of providing a substantially rectangular panel of metal having at least first and second spaced apart generally parallel peripheral edges; rolling the first edge around an elongate metal rod; folding the panel of metal along a line generally parallel to the edges to produce an elongate generally L-shaped metal piece; and, rolling the L-shaped metal piece to compress selected areas of the L-shaped metal piece such that the metal piece takes on a cylindrical shape.

In another embodiment of the invention, I provide an improved method for producing a hollow cylindrically shaped flange to be mounted on the end of a hollow cylindrical duct. The method includes the steps of providing a substantially rectangular panel of metal having at least first and second spaced apart generally parallel peripheral edges; folding the panel of metal along a line generally parallel to the edges to produce an elongate generally L-shaped metal piece; and, rolling the L-shaped metal piece between a pair of rollers each rotating about an axis generally parallel to the axis of the other roller, the L-shaped metal piece exiting the rollers along a arcuate path lying in a plane substantially normally to a plane passing through the axes of the rollers.

In a further embodiment of the invention, I provide an article of manufacture comprising a flange connector for the end of an air duct. The flange connector includes a hollow member having a first end and a second end; and, a rim integrally formed with and connected to the first end and including an arcuate panel tapering as the distance of the rim away from the hollow member increases.

Figure 1:
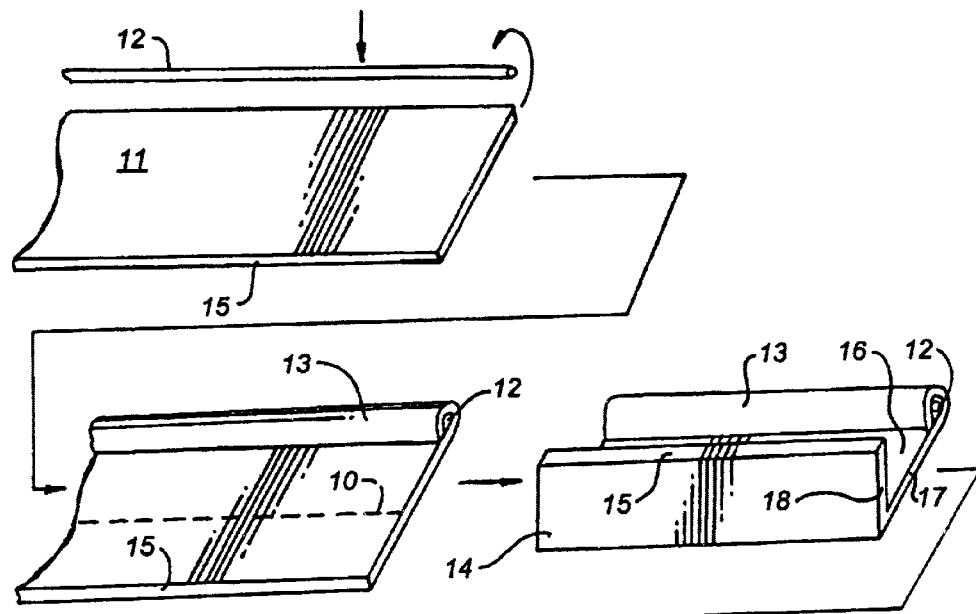
FIG. 1 is a flow diagram illustrating the manufacture of an end flange to be mounted on the end of a cylindrical air duct.

Turning now to the drawings, which depict the presently preferred embodiment of the invention for the purpose of illustrating the practice thereof and not by way of limitation of the scope of the invention, and in which like reference characters refer to corresponding elements throughout the several views, FIG. 1 illustrates the method of the invention in which a peripheral edge of a generally rectangular sheet or panel 11 of metal is rolled, wrapped, and/or stretched around an elongate rod 12 made of metal or another desired compressible deformable material to produce an elongate strengthened and reinforced edge 13. The panel 11 is then folded along line 10 to produce an L-shaped piece including edge 13, edge 15 parallel to edge 13, the "leg" panel 16 of the L shape, and the upstanding panel 14 of the L shape. Panel 14 is at an angle, preferably about 90 degrees, to panel 16. Panel 16 includes leading edge 17. Panel 14 includes leading edge 18. The L-shaped piece is directed in the direction of arrow E between a pair of rollers 21 and 22 which shape the piece into the "top hat" shaped article of manufacture 20 depicted in FIG. 2. Roller 21 rotates in the direction indicated by arrow C. Roller 22 rotates in the direction indicated by arrow D.

Rolling a peripheral edge of panel 11 to form over rod 12 edge 13 is important because it provides article of manufacture 20 with necessary structural strength and integrity. Rod 12 can be solid or hollow.

Figure 3:
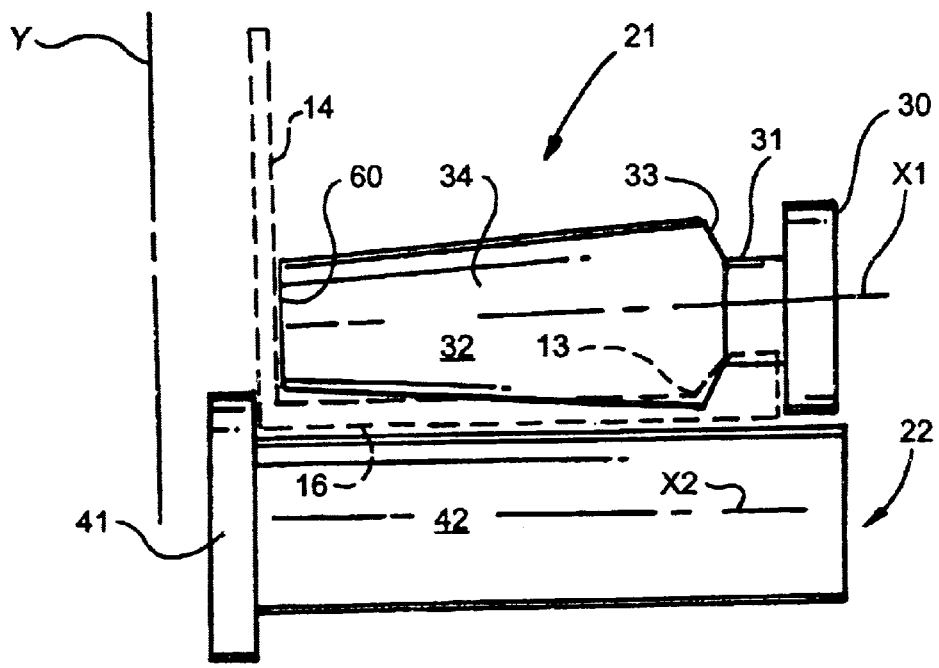
FIG. 3 is a front elevation view illustrating roller apparatus used in the method of the invention.

The shape and dimension of rollers 21 and 22 is critical in the practice of the invention. As illustrated in FIG. 3, a portion 34 of roller 21 has a conical, or tapered configuration. The portion 42 of roller 42 opposing portion 34 is cylindrical. This configuration is important because rollers 21 and 22 function together to bend the L-shaped piece about a vertical axis Y which is normal or at an angle to the axes of rotation X1 and X2 of rollers 21 and 22.

Further when the L-shaped piece at least initially exits rollers 21 and 22, panel 16 tends (even though it is being bent about axis Y) to be moving in a flat plane P which is normal to the flat plane which passes through axes X1 and X2. The location of panel 16 in this plane P can be seen in FIG. 1 and in FIG. 3. In some embodiments of the invention, however, it is desirable for panel 16 to follow a gently rising helical path as it exits rollers 21 and 22 so that when edge 17 has completely "wrapped around" axis Y and is again adjacent roller 21 it can, if necessary, travel up over the top of roller 21.

Figure 4:
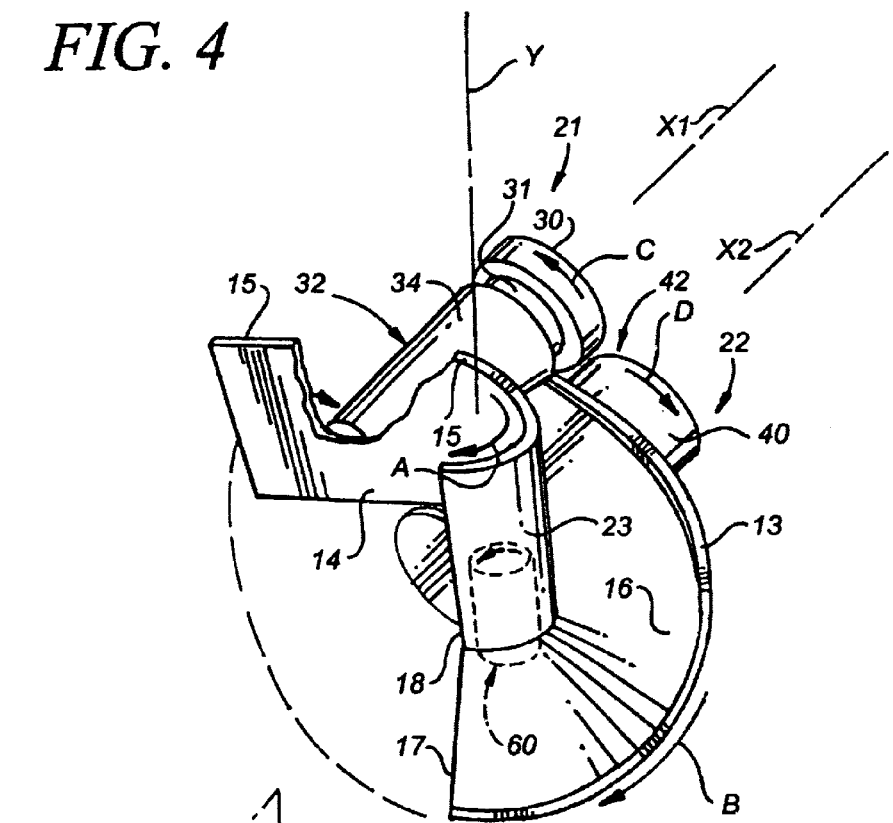
FIG. 4 is a perspective view illustrating a cylindrical end flange being produced by the roller apparatus of FIG. 3.

Rollers 21 and 22 function to bend the L-shaped piece because the rollers compress and stretch edge 13 and panel 16. As is indicated in FIG. 3, the amount by which panel 16 is compressed increases as the distance from panel 14 increases and the distance from edge 13 decreases. Consequently, material in panel 16 which is close to panel 14 and far from edge 13 is compressed less than material in panel which is close to edge 13 and is farther from panel 14. As the location of an area of portion of the material comprising panel 16 is farther from panel 14 and is closer to edge 13, the amount that the material is compressed and stretched increases so that L-shaped piece wraps around axis Y in the manner illustrated in FIGS. 1 and 4. The taper of conical surface 32 of portion 34 of roller 21 accomplishes this function because, as can be seen in FIG. 3, the portion of surface 32 furthest from panel 14 compresses panel 16 more than the portion of surface 32 closest to panel 14.

As would be appreciated by those of skill in the art. The shape and dimension of rollers 21 and 22 can vary as desired to accomplish the desired function. Roller 22 can be conically shaped. Roller 21 can be cylindrically shaped. Both rollers may be conically shaped. And so on.

Cylindrical lip 41 can be attached to roller 42 to engage panel 14 and maintain panel 14 against or adjacent end 60.

Figure 5:
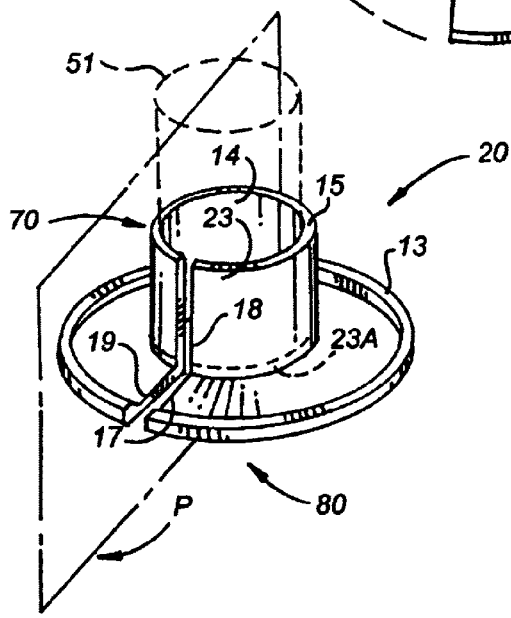
FIG. 5 is a perspective view illustrating a cylindrical flange constructed in accordance with the method and apparatus of the invention.

As shown in FIG. 5, the article of manufacture 20 produced by rollers 21 and 22 includes a hollow, cylindrically shaped portion 70 comprising panel 14 rolled into a cylindrical shape. Edge 15 of panel 14 takes on the circular configuration shown in FIG. 5. The cylindrically shaped portion in FIG. 5 includes an upper end terminating at edge 15 and includes a lower edge connected to a rim 80. The rim 80 is normal to the cylindrically shaped portion. Panel 16, as stretched, compressed, and tapered by rollers 21 and 22, and edge 13, as stretched and compressed and possibly tapered by rollers 21 and 22, comprise rim 80.

Figure 2:
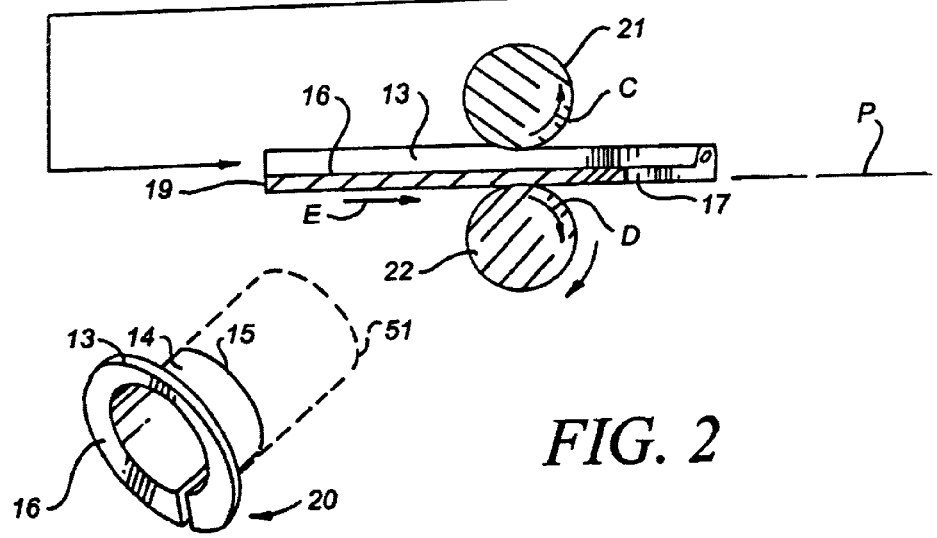
FIG. 2 is a perspective view illustrating a cylindrical air flange constructed in accordance with the method and apparatus of the invention.

In use of the article of manufacture 20, portion 70 slidably engages the end of a duct, either by sliding over the end of duct 50 in the manner illustrated in FIG. 5, or by sliding into the end of a duct 51 in the manner illustrated in FIG. 2. After portion 70 slidably engages the end of a duct, it is fastened to the duct with screws, adhesive, or another other desired fastening means.

To secure together a pair of adjacent duct ends, a first article of manufacture 20 is attached to the end of one duct in the manner described (with portion 70 slidably engaging and then fastened to the end of the duct), and a second article of manufacture 20 is attached to the end of the other duct in the manner described. The rim 80 of the first article of manufacture is then positioned parallel to, adjacent to, and in registration with the rim 80 of the second article of manufacture, and the two adjacent rims 80 are fastened together in any desired manner.

Figure 6:
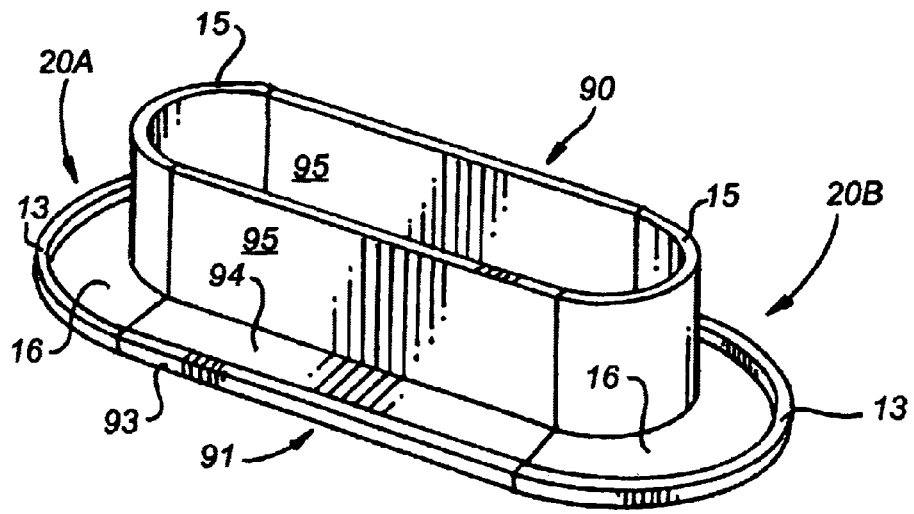
FIG. 6 is a perspective view illustrating an end flange constructed for an oval duct.

The article of manufacture 20 of FIG. 5 can be cut in half along a plane P (FIG. 5) which bisects article of manufacture 20. So cutting article of manufacture 20 produces mirror halves 20A and 20B. As illustrated in FIG. 6, straight L-shaped flange members 90 and 91 can be used to interconnect halves 20A and 20B to form an end flange which can be utilized during the interconnection of the ends of oval ducts. L-shaped flange 91 includes flat panel-shaped foot 94 and flat upstanding panel 95 connected to foot 94. The shape and dimension of flange 90 is identical to that of flange 91. Any desired means can be used to fasten flanges 90 and 91 to halves 20A and 20B. Flanges 90 and 91 can be shaped and dimensioned to slide onto a portion of each half 20A and 20B or to otherwise facilitate the interconnection of flanges 90 and 91 with halves 20A and 20B.

Figure 7:
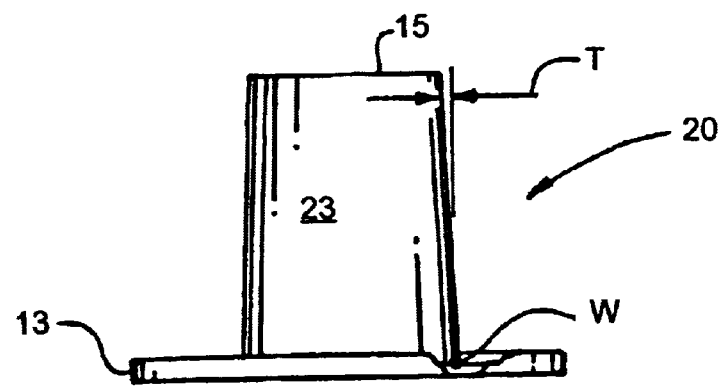
FIG. 7 is a side view of the flange of FIG. 5 illustrating the taper in the hollow cylindrical portion of the flange.

In FIG. 5, the upstanding hollow cylindrical wall is formed when panel 14 passes between rollers 21 and 22 and takes on the cylindrical shape depicted. As this cylindrical wall 14 extends outwardly away from the "brim" or flange consisting of panel 16 and edge 13, the cylindrical wall 14 tapers slightly inwardly. Consequently at upper edge 15, the cylindrical wall 14, as indicated by arrows T in FIG. 7, tilts inwardly about three thirty-seconds of an inch from the position of wall 14 at point W. In other words, the diameter of cylindrical wall 14 at edge 15 is about three-sixteenths of an inch less than the diameter of wall 14 adjacent panel 16. This slight taper is important because when cylindrical panel 14 is fastened to a cylindrical duct 51 (FIG. 2), the taper makes sliding circular panel 16 into duct 51 easier and makes it less likely that one portion of panel 16 will be snug against duct 51 while other portions of panel are not snug against duct 51. The slight taper makes it more likely that panel 16 will be fastened snugly against duct 51 along the entire circumference of panel 16, especially when screws are used to fasten a duct 51 to panel 16.

Figure 8:
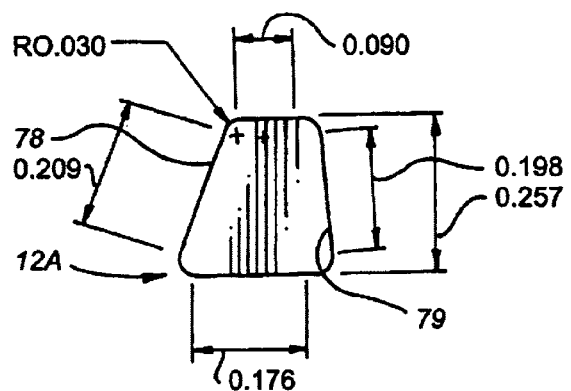
FIG. 8 is an end view illustrating the cross-sectional shape of a bar used in the practice of the invention; and, FIG. 9 is an end view of the L-shaped panel illustrating the bar of FIG. 8 rolled into an edge of the panel prior to the L-shaped panel being rolled into the cylindrical shape of FIG. 5.

The rod 12A illustrated in FIG. 8 is presently preferred in the practice of the invention because it is solid, because it has edges (albeit radiused edges), and because walls or sides 78, 79 slope inwardly. The use of a rod with edges tends to produce a stronger and more rigid edge 13 than a round rod or bar. The use of inwardly sloping sides 78, 79 is preferred because they facilitate the compression and reduction of edge 13 when it passes between rollers 21 and 22. When edge 13 passes between rollers 21 and 22, it is compressed by up to 16% of its height of 0.257 inches, depending on the desired diameter of cylindrical wall 14 in FIG. 5. Rod 12A preferably consists of 1008 steel, but any other desired material can be utilized. A metal is preferred so that an edge 13 with sufficient strength and rigidity is produced.

Figure 9:
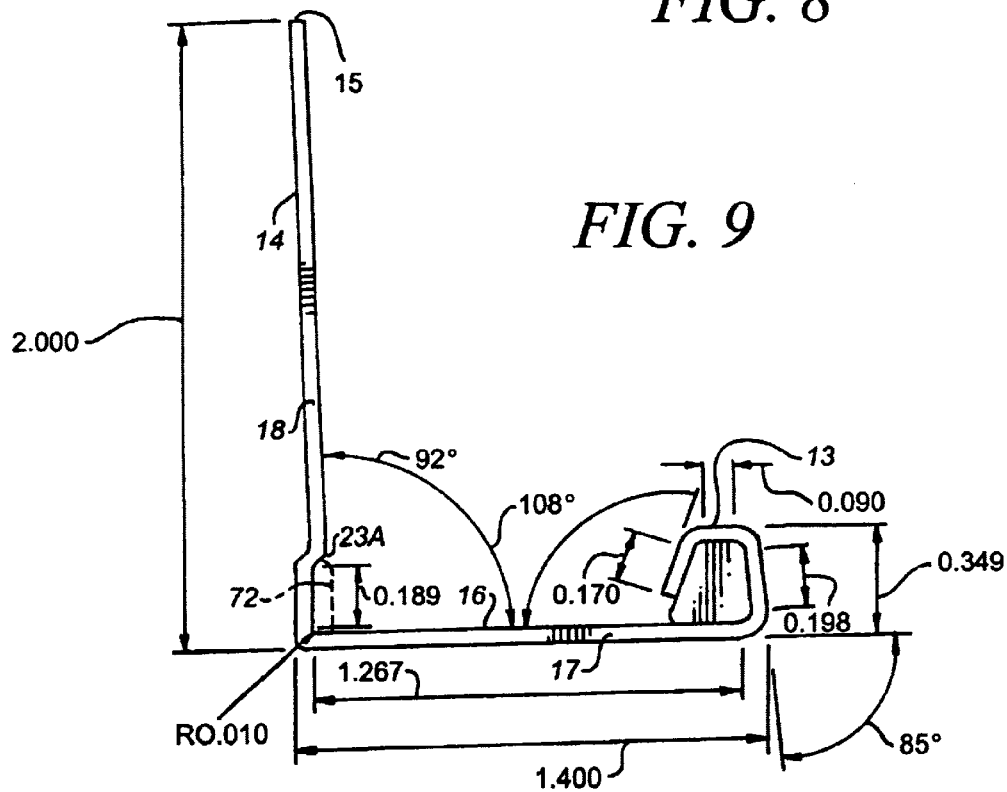

A groove or indent 23A can be formed at the bottom of panel 14 near panel 16. Before cylindrical wall 14 is slid into a cylindrical duct 51 (FIG. 2), sealant 72 panel 16. Before cylindrical wall 14 is slid into a cylindrical duct 51 (FIG. 2), sealant 72 (FIG. 9) can be inserted in indent 23A to facilitate the sealing of article of manufacture 20 to the end of a cylindrical duct 51.

Having described my invention in such terms as to enable those skilled in the art to understand and practice it and having described the presently preferred embodiments thereof, I claim:

1. A method for producing a hollow cylindrically shaped flange to be mounted on the end of a hollow cylindrical duct, comprising the steps of (a) providing a substantially rectangular panel of metal having at least first and second spaced apart generally parallel peripheral edges;

(b) rolling the first edge around an elongate metal rod;

(c) folding the panel of metal along a line generally parallel to the edges to produce an elongate generally L-shaped metal piece; and, (d) rolling the L-shaped metal piece to compress selected areas of the L-shaped metal piece such that the metal piece takes on a cylindrical shape.

* * * * *